US006769846B2

(12) United States Patent
Campbell, Jr. et al.

(10) Patent No.: US 6,769,846 B2
(45) Date of Patent: Aug. 3, 2004

(54) COUPLING DEVICE

(75) Inventors: Robert L. Campbell, Jr., Hickory, NC (US); Kevin E. Moran, Belmont, NC (US)

(73) Assignee: Walter Perske GmbH, Mannheim (DE)

( * ) Notice: Subject to any disclaimer, the term of this patent is extended or adjusted under 35 U.S.C. 154(b) by 120 days.

(21) Appl. No.: 10/226,084

(22) Filed: Aug. 22, 2002

(65) Prior Publication Data

US 2004/0057806 A1 Mar. 25, 2004

(51) Int. Cl.[7] .............................. B23C 5/26; B23Q 11/06
(52) U.S. Cl. ...................... 409/232; 279/131; 279/141; 279/157; 279/158; 409/134; 409/186; 409/209
(58) Field of Search ................................ 279/131, 129, 279/130, 141, 157, 158; 409/232, 231, 233, 234, 134, 186–187, 193, 194, 207–209; 408/239 R, 240

(56) References Cited

U.S. PATENT DOCUMENTS

| | | | | |
|---|---|---|---|---|
| 2,207,621 A | * | 7/1940 | Hite | 279/131 |
| 3,467,404 A | * | 9/1969 | Sloan | 279/131 |
| 3,573,876 A | * | 4/1971 | Powell | 409/232 |
| 3,692,319 A | * | 9/1972 | Taylor | 279/131 |
| 3,709,508 A | * | 1/1973 | Dudley | 279/131 |
| 3,837,661 A | * | 9/1974 | Phillippi | 279/131 |
| 3,975,029 A | * | 8/1976 | Benjamin | 279/131 |
| 4,789,169 A | * | 12/1988 | Hakansson | 279/131 |
| 5,820,135 A | * | 10/1998 | Han et al. | 279/131 |

FOREIGN PATENT DOCUMENTS

JP          59-107809 A   *   6/1984

* cited by examiner

*Primary Examiner*—Erica Cadugan
(74) *Attorney, Agent, or Firm*—Alston & Bird LLP

(57) ABSTRACT

A coupling device for engaging an exchangeable tool support (7) for corotation with a shaft (2) of a motor (1), with the shaft (2) mounting at is driven end a hollow shaft projection (3) for receiving the tool support (7). Alternatively, the tool support (7) can mount the hollow shaft projection for receiving the driven end of the shaft. The shaft (2) and/or the tool support mounts a locking device for securing the tool support (7), and which is actuated by centrifugal force. The coupling device is designed and constructed so as to permit a simple mounting of even heavy tools to the output shaft of the motor, and a reliable connection of the tool and drive.

18 Claims, 2 Drawing Sheets

COUPLING DEVICE

BACKGROUND OF THE INVENTION

The invention relates to a coupling device for engaging an exchangeable tool support for corotation with the shaft of a motor, with the shaft comprising at its driven end a hollow shaft projection for receiving the tool support, or the tool support comprising a hollow shaft projection for receiving the driven end of the shaft, and with the shaft and/or the tool support comprising a locking device for securing the tool support.

A known coupling of rotatably driven tools with the shaft of a motor provides on a shank of the tool a cone that is inserted into an associated inner cone at the driven end of the motor shaft. By pressing the cone into the inner cone, a press fit is produced, which enables a transmission from the shaft to the tool. However, in the case of such couplings, it turns out to be very difficult to disengage the cone from the inner cone against the resistance of the press fit.

Further known are simple coupling devices, for example, for small, hand-held drills, which include in a conical hollow shaft, a chuck comprising a plurality of jaws and being likewise conical in its peripheral surface. This chuck is inserted into the hollow shaft. A coupling nut with an opening is adapted for being screwed onto the conical. hollow shaft. When being tightened, the nut causes the chuck to be pushed into the hollow shaft, and the jaws to be clamped against one another. In this manner, it is possible to connect a tool that is insertable into the chuck for corotation with the driven end of the drill.

However, it has shown that these coupling devices are on the one hand uncomfortable and time-consuming as regards the insertion of a tool or during a tool change, since they require many manipulations. Consequently, coupling devices of this type cannot be easily transferred to larger machines and heavy tools. On the other hand, however, these coupling devices provide no lasting connection between the tool and driven end, since the screw connection can disengage during the machining operation as a result of vibrations, and thus releases the tool. This constitutes a substantial safety risk primarily in the case of rapidly rotating tools.

It is therefore an object of the present invention to provide a coupling device, which enables a rapid insertion of even heavy tools, and simultaneously ensures a reliable locking engagement of the tool with the drive.

SUMMARY OF THE INVENTION

The above and other objects and advantages of the present invention are achieved by the provision of a coupling device of the described type and which includes a locking device which is actuated by centrifugal force.

According to the invention, it has been recognized that, departing from previous construction principles which produce a locking engagement primarily as a result of separately applied forces, it is possible to use the naturally occurring centrifugal forces for locking the rotated bodies. With that, it becomes unnecessary to apply an additional force for purposes of locking, which saves the user of the device additional manipulations and time.

According to an advantageous development of the invention, the locking device comprises at least one locking member, which is adapted for engaging in a locking manner a connection element on the tool support and/or the shaft due to the centrifugal forces occurring during the rotation. To this end, the locking device comprises a locking member, whose mass center is arranged off center with respect to the axis of rotation of the drive shaft, and which thus tends to move outward as the rotation sets in. With that, the locking engagement is automatically produced between the connection element and the hollow shaft projection immediately upon the start of the rotation. This saves not only operating time and efforts for producing the locking engagement, but also excludes in addition a possible source of error due to a faulty operation.

In the case of machine tools with rapidly rotating tools, the highest priority should be given to work safety. In the construction of machine tools, which cannot be enclosed against an unwanted collision between other objects or of an operator with the tool, since they must be at least in part freely accessible as a necessity of machining the workpieces, it is therefore highly necessary to see to it that no hazards originate from the rapidly rotating tools, as would exist, for example, in the case of a premature or uncontrolled disengagement of the tool.

It is also desirable to provide a construction wherein with the tool inserted while the motor is still off and thus before the start of the locking engagement, an initial locking engagement occurs. This initial locking engagement could be realized in that the locking member is biased in the direction of the centrifugal force. It is therefore necessary to push the connection element into the hollow shaft projection against a biasing force. On the one hand, a noise occurring during the initial locking engagement gives the operator the certainty that the tool is secured. On the other hand, the initial locking engagement makes it possible that the connection element and hollow shaft projection reach that position, which is necessary for a functional locking engagement by the centrifugal force.

According to an advantageous development of the invention, it would be possible to bias the locking device hydraulically, pneumatically, or mechanically. Primarily, a bias by means of a spring provides a constructionally simple and cost-favorable biasing means.

The essential function of the coupling device is to transmit forces between the hollow shaft projection and the connection element. A transmission between these two parts may basically occur by a formfitting or by a frictional engagement. According to an advantageous development of the invention, it would therefore be possible to provide that the traverse cross sections of the hollow shaft projection and the connection element are made to correspond with each other, for example, in that they are realized as a standardized formfitting connection, and that they thus ensure a formfitting transmission. Such connections, for example, such with hexagonal cross sections can be produced in a simple and cost-favorable manner. Primarily, however, they are insensitive to axial displacements of the connection element relative to the hollow shaft projection.

In addition or as an alternative, the bore of the hollow shaft could include for a mutual contact an internal cone and the connection element a corresponding external cone. These rotationally symmetric cross sections offer the advantage that they can be produced with a high precision.

Contrary to a formfitting connection, it is also desirable to apply an axial force by frictional engagement to keep the force-transmitting surfaces in contacting relationship. This axial force can be manually applied when inserting the tool, and be maintained by a press fit of the conical parts. According to an advantageous development, an oblique surface on the locking member could deflect a portion of the centrifugal force that acts upon the locking member, and apply an axial force to the tool support. In this manner the press fit between the connection element and the hollow shaft projection can be produced. To this end, it would be possible to use as the oblique surface a sloping contact surface between the locking member and tool support. With that, it would be possible to eliminate a further operating step in the assembly of the tool support.

In an advantageous further development, the conical surfaces of the hollow shaft projection and/or the connection element could be made for a transmission by frictional engagement, in particular with a high surface quality. As a result of making the surfaces of the conical areas as smooth as possible, it is possible to avoid that they become wedged, and cannot be separated from each other, or that they can be separated only with great efforts after the use of the tool support.

Basically, any number of locking members is possible. Since the coupling device is a rapidly [fast] rotating part, it is only necessary to see that the locking members do not produce undesired unbalances. Therefore, at least the use of only one locking member requires quite considerable time and efforts for balancing the coupling device. Consequently, according to an advantageous development, it would be possible to provide two locking members, which are radially opposite to each other with respect to the axis of rotation. In the case of identical masses for both locking members, it would be possible to obtain a balanced mass distribution while avoiding unbalances.

According to a further advantageous development, a balanced mass distribution could also be ensured in that the locking members are parts of essentially the same construction. When the locking members extend as an alternative thereto or in addition in the same plane in orthogonal relationship with the axis of rotation of the shaft, it will also be possible to avoid alternating bending stresses on the shaft and unnecessary loads of the shaft bearing.

Basically, it is irrelevant whether the locking member is made integral with the connection element or with the hollow shaft projection. Both types of construction offer special advantages. Thus, it would be possible that in one embodiment the locking member is arranged in the connection element and that it extends into a recess in the hollow shaft projection. The free and unused outer surface of the hollow shaft connection could then be used, for example, as an attachment for tools, which makes it possible to realize a very compact construction for the coupling device.

In an alternative embodiment, the locking member could also engage the connection element through an opening in the hollow shaft projection. In this manner, one would realize a particularly satisfactory accessibility of the locking members, which substantially simplifies the maintenance of the coupling device.

For both alternatives different locking mechanisms are possible, which all operate by the principle of sliding a section on the locking member into a recess on the connection element in a direction orthogonal to the direction that is to be blocked, and of thus locking the connection member in the axial direction. According to an advantageous configuration, a locking member could be provided to this end, which has an opening for passing therethrough the connection element for locking it. In the locked position, the locking member could surround the connection element either in hook-shaped or in ring-shaped relationship. In this manner, an as large as possible contact surface is realized between the locking member and connection element, which effects a favorable distribution of force.

According to a particularly advantageous development, one could arrange two locking members, which form together an opening for receiving the connection element. With that, the connection element would be enclosed all around in the locked position, which would mean a particularly safe locking engagement.

In a development that is to be preferred in particular, one could provide that the locking members extend through each other and overlap at least in part in the region of the opening. A construction of this type makes it possible to arrange the locking members or their centers of gravity in the same plane in orthogonal relationship with the axis of rotation. With that, the hollow shaft projection undergoes no alternating bending stress, which could produce a wobbling motion and considerably stress the bearing of the shaft, primarily in the case of rapid rotation. Furthermore, the locking members surround the connection element likewise in the same plane. With that, the force introduction surfaces on the connection element also extend in the same plane, so that likewise this element undergoes no alternating bending stress, and that no wobbling motion is induced.

Among other things, operational safety requires that the machine tools constitute no source of hazard, even in the case of rotation without an inserted tool. To avoid that in their unlocked state, the locking members are flung out of the opening in the hollow shaft projection, a further advantageous development provides a retaining element, for example, a ring extending about the outside of the hollow shaft, which retains the locking members against the effective direction of the centrifugal force. Besides the safety aspect, such a retaining element could also assume the function of limiting the effect of the centrifugal force on the connection element, in that it absorbs a portion of the centrifugal force.

According to a further advantageous development, the locking member could support itself on the retaining element by a biased spring. This means that the retaining element could also be used to function as an abutment for a compression spring, which could provide an initial locking.

To this end, an advantageous further development could provide that the locking members each include a bore in the direction of the centrifugal force for receiving a biased spring respectively associated to the other locking member. Thus, the bore through each locking member could be used at the same time for receiving and guiding a compression spring for biasing respectively the other locking member. With that, a particularly simple and compact construction would be realized.

Basically, any configuration of the connection element is possible, which allows the locking members to engage the connection element. According to a particularly advantageous development, the connection element could include a substantially peripherally extending narrowing, necking, undercut, or the like for engaging a locking member. Such a configuration is rotationally symmetric in the same way as the remaining connection element, and is therefore especially simple and cost-favorable to make.

Since machine tools with rapidly rotating tools exhibit a particularly high hazard potential, it will be useful to provide further safety devices, which operate independently of the so-far described locking device. To this end, one could provide in accordance with an advantageous further development of the invention, a tool support that includes on its side facing away from the motor, a rotation symmetric peripheral narrowing, groove, undercut, or the like, for receiving a safety device that is detachably arranged on a stationary abutment, for example, a housing of the motor, for preventing an axial relative movement of the tool support. This would preclude an undesired separation of the tool support from the shaft, even in the case of a failure of the locking device.

According to a particularly advantageous development, one could provide that in the locked position, the safety device engages the narrowing, etc. without contacting. No contact between the tool support and safety device would effectively prevent the tool support from developing noise and from overheating as a consequence of the otherwise high friction between the fast rotating tool support and the stationary safety device.

During a failure of the locking device, the tool support typically performs an axial movement out the hollow shaft projection, thereby resulting in a contact between the safety device and the tool support. In another advantageous further development, one could provide that upon a contact of the safety device with the tool support, a signal can be released, and/or the motor can be blocked and/or disconnected. The signal could cause an optical or an acoustical alarm signal or a braking of the shaft, or that the energy supply to the motor could be disconnected. In this manner a safety device is provided, which offers the greatest possible protection during a failure of the safety device, since it automatically warns of a source of hazard or eliminates it.

An electric motor for driving a rotatably operated tool could be further developed in an advantageous manner to the extent that the driven end of its shaft mounts a coupling device in accordance with the invention.

There exist various possibilities of improving and further developing the teaching of the present invention in an advantageous manner. To this end, one may refer to the following detailed description of a preferred embodiment with reference to the drawing. In conjunction with the description of the embodiment with reference to the drawing, also generally preferred improvements and further developments of the teaching are explained.

DETAILED DESCRIPTION OF THE PREFERRED EMBODIMENTS

Figure 1:
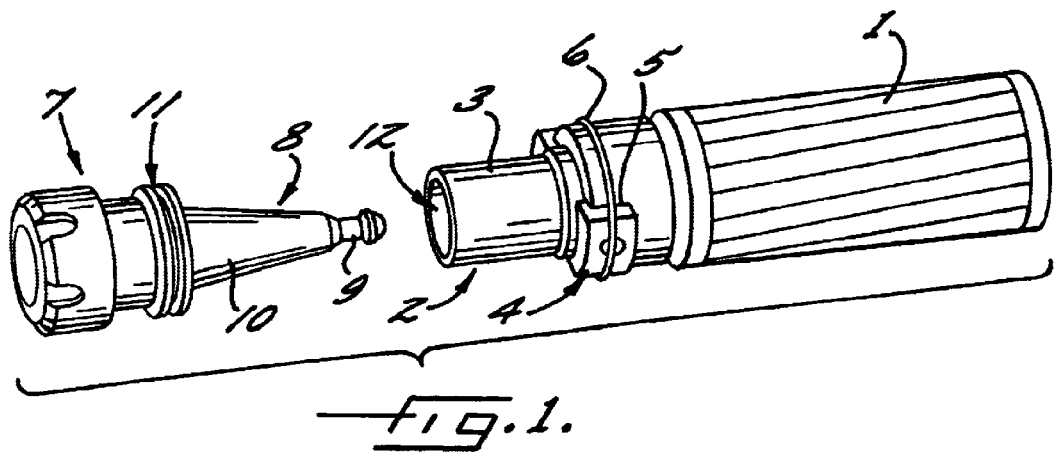
FIG. 1 is a side view of an electric motor with a coupling device according to the invention and a disengaged tool support.

FIG. 1 illustrates a motor 1 of a machine tool with a shaft 2, whose driven end mounts a hollow shaft projection 3 with two locking members 4, one of which is covered, and includes an internal cone 12. The locking members 4 are arranged for radial displacement in an opening 5 provided in hollow shaft projection 3, and are held by a ring 6.

A tool support 7 with a connection element 8 can be inserted into the hollow shaft projection 3. The connection element 8 itself is subdivided into a locking head 9, a cone 10, and an annular groove 11.

For coupling the tool support 7 with the motor 1, the connection element 8 is inserted into the internal cone 12 of hollow shaft projection 3. In so doing, the locking head 9 comes to lie in the region of the locking members 4. When the hollow shaft projection 3 is now put into rotation by the motor 1, the locking members 4 will tend to move radially outward due to the centrifugal force acting upon them, and engage the tool support 7 on its locking head 9. In this position, the cone 10 of tool support 7 and the internal cone 12 of hollow shaft projection 3 come into contact with each other and thus constitute a frictional engagement for a transmission.

Figure 2:
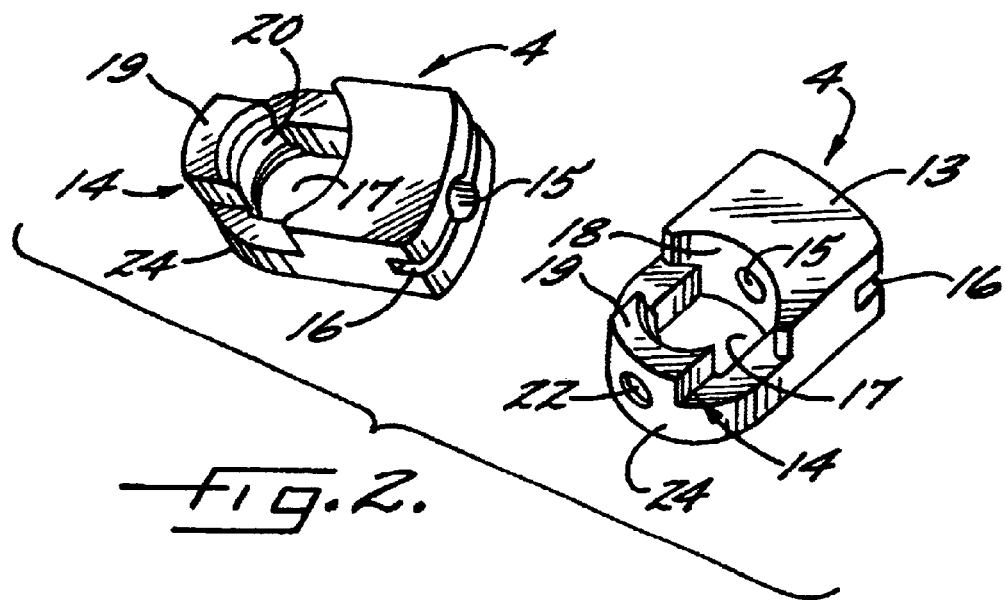
FIG. 2 shows two side views of a locking member.

FIG. 2 illustrates two different views of the locking members 4. In essence, each locking member consists in terms of weight of a heavy mass body 13 and in comparison therewith a light and annular openwork body 14. Along the axis of symmetry of locking member 4, a bore 15 extends through the mass body 13. A groove 16 extends into this bore and along a narrow outer side of the mass body 13 by being cut thereinto.

Figure 3:
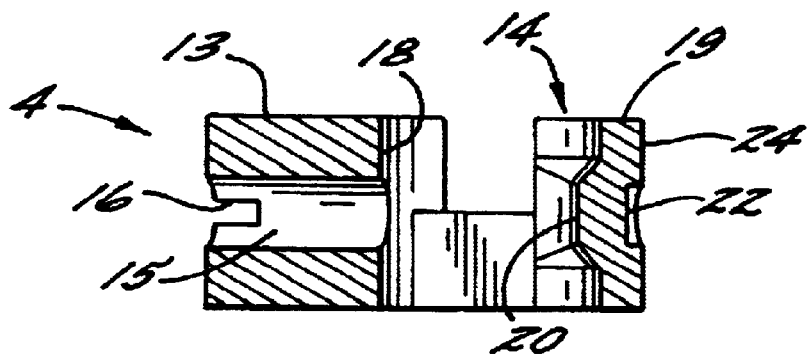
FIG. 3 is an axially sectioned view of a locking member.

The openwork body 14 includes an opening 17, which is essentially defined by an inner side of the mass body 13 and a claw 19. The claw 19 itself includes on its side facing the opening 17 a contact surface 20, which is specially shaped for engaging the locking head 9 of tool support 7. The outer side of the claw 19 opposite to the contact surface 20 includes in the axis of symmetry of the locking member 4, a recess 22, which corresponds in its position and diameter to bore 15. This configuration of the locking member 4, and here in particular that of the surface of contact surface 20 is best seen in the sectional view of the locking member 4 of FIG. 3.

Figure 4:
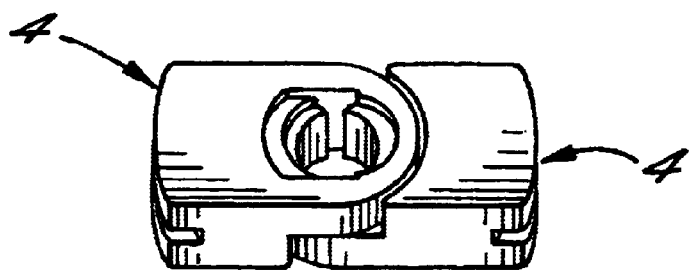
FIG. 4 shows two locking members in their locked position.

This special configuration of the locking members 4 makes it possible to arrange them opposite to each other in the same plane in orthogonal relationship with the axis of rotation of the hollow shaft projection 3. To this end, the two locking members partially overlie each other such that the claw 19 of one locking member engages the opening 17 of the other locking member 4 such that its outer side 21 faces the inner side 18 of mass body 13 of respectively the other locking member 4. Together, the two locking members 4 form an opening for receiving the connection element 8. This opening is best seen in FIG. 4, which illustrates the mutual association of the locking members 4 in the locked position, but outside of the hollow shaft projection 3.

Since the locking members 4 are constructed as structurally identical parts, and since they extend in radially facing relationship with respect to the axis of rotation of the hollow shaft projection 3 and because of their mutual engagement in the same plane in orthogonal relationship with the axis of rotation of the hollow shaft projection 3, unbalances resulting from the locking members 4 are essentially excluded, and time and efforts for balancing the rotating parts on the shaft 2 are effectively minimized.

The bores 15 of both locking members 4 each accommodate a compression spring (not shown), which supports itself on the one hand on the ring 6 extending through the groove 16, and on the other hand in the recess 22 of respectively the other locking member 4. The springs are operative in the direction of the centrifugal force. They push the locking members 4 apart, i.e. compress the claws 19, and thus provide a biased starting position. When a connection element 8 is now to be coupled, it must first spread the claws 19 against the force of the springs. To this end, the forward end of the locking head 9 includes a truncated enlargement 26, and the contact surface 20 is provided with a corresponding slope. Once the spring force is overcome, the claws 19 of the locking members 4 audibly snap behind the enlargement 26 of the locking head 9. The snapping sound indicates to the operator of connection element 8 that an initial locking has occurred, and that the tool support 7 is safely engaged. The claws 19 now surround the locking head 9 of connection element 8 almost completely. This establishes the position of the connection element 8 and hollow shaft projection 3 relative to each other, as is required for a reliable locking engagement during use.

When the coupling device is now rotated, the mass bodies 13 tend to move apart, and the respective claws 19 or their contact surfaces 20 tend to move toward each other. In this manner, the locking head 9 of connecting element 8 on the tool support is immovably held between the claws 19 of the locking members 4.

Figure 5:
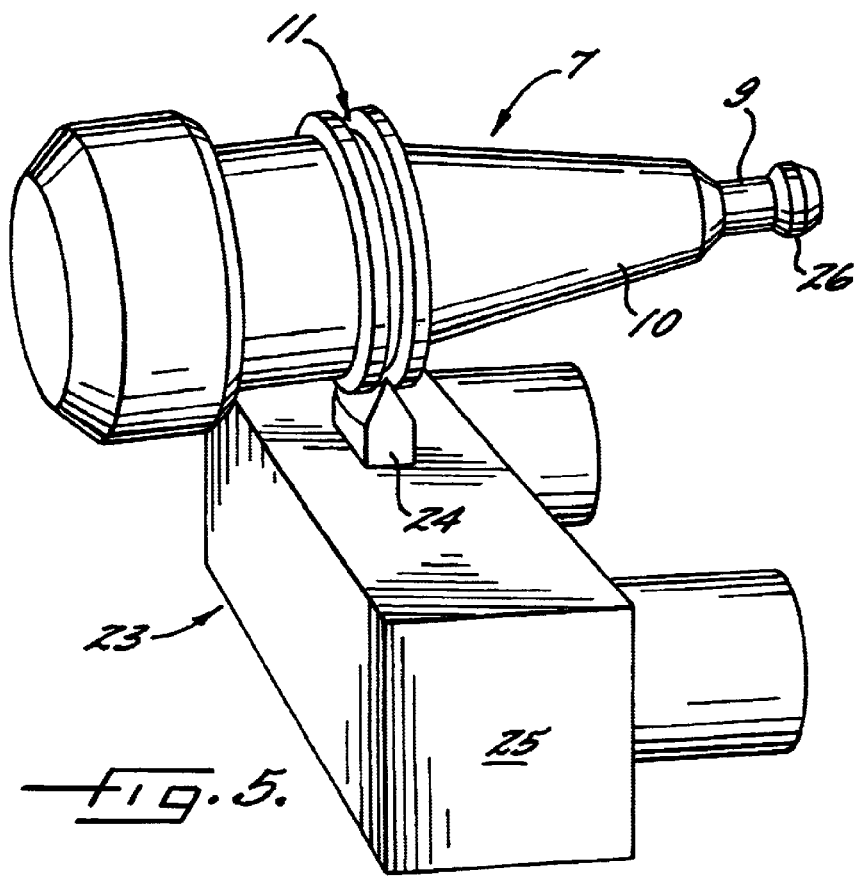
FIG. 5 shows a tool support with a safety device.

FIG. 5 illustrates a safety device 23 for the tool support 7. The safety device essentially comprises a ridge 24, which is arranged on a holder 25. The holder 25 in turn is detachably arranged on a stationary abutment, for example, the motor housing or a common base plate of motor 1 and holder 25. After inserting the tool support 7 into the hollow shaft projection 3, the safety device 23 is mounted in such a manner that the ridge 24 engages the annular groove 11 on the tool support 7. In this manner, it is made sure that in the event of a failure of the coupling device, the tool support 7 cannot be removed from the hollow shaft projection 3, since the safety device 23 blocks it.

Furthermore, it is possible to associate additional functions to the safety device 23. Once the safety device 23 is adjusted, so that the ridge 24 extends in the ring groove 11 in a noncontacting relationship, it will be possible to release an electrical signal upon a mechanical contact between the ridge 24 and annular groove 11. This signal either causes a signaling lamp to light, or it releases an acoustical alarm signal. With that, the operator of the machine tool is alerted that the coupling device has failed, and that the tool support 7 has disengaged from its locked position. The electrical signal can also be used to interrupt the energy supply to the motor 1, and to brake or block the rotation of the shaft 2 immediately, so that no hazard originates any longer from the tool support 7.

What is claimed is:

1. A device for releasably coupling a machine tool support to a drive motor which rotates the machine tool support about an axis, said device comprising
   a hollow shaft projection connected to the drive motor,
   a connection element configured to be received within the hollow shaft projection and being connected to the tool support,
   a locking device for releasably securing the connection element within the hollow shaft projection and which is actuated by centrifugal force exerted during rotation of the drive motor and tool support, and
   wherein the locking device comprises at least one locking member which is mounted to the hollow shaft projection for limited radial movement relative thereto so as to engage the connection element in a locking relationship by reason of the centrifugal force, and
   wherein the at least one locking member includes an oblique surface that is oblique with respect to the axis of rotation and that mates with a corresponding oblique surface on the connection element such that a portion of the centrifugal force is deflected to an axial force upon the tool support.

2. The coupling device of claim 1 further comprising means for biasing said at least one locking member in the direction of the centrifugal force.

3. The coupling device of claim 1 wherein transverse cross sections of the hollow shaft projection and the connection element closely correspond to each other so as to provide a formfitting interengagement.

4. The coupling device of claim 3 wherein the hollow shaft projection has a bore which defines an internal cone, and the connection element defines an external cone.

5. The coupling device of claim 3 wherein the mating oblique surfaces which act to deflect a portion of the centrifugal force to an axial force upon the tool support produce a press fit between the hollow shaft projection and the connection element.

6. The coupling device of claim 1 wherein the at least one locking member comprises two locking members which are mounted to the hollow shaft projection, with the two locking members being mounted for limited movement in opposite and aligned radial directions and so that each locking member engages the connection element in a locking relationship by reason of the centrifugal force.

7. The coupling device of claim 6 wherein the two locking members are substantially identical in configuration and extend in a plane which is perpendicular to the rotational axis.

8. The coupling device of claim 7 wherein each locking member is mounted to the hollow shaft projection so as to extend through a radial opening in the hollow shaft projection.

9. The coupling device of claim 8 wherein each locking member includes an opening through which the connection element can be inserted, and wherein the openings of the two locking members are aligned.

10. The coupling device of claim 9 wherein the two locking members overlap in the region of the openings.

11. The coupling device of claim 10 further comprising a retaining ring positioned to encircle the outside of the hollow shaft projection and overlie each of the locking members so as to limit radial movement of the locking members within their respective openings in the hollow shaft projection caused by the centrifugal force.

12. The coupling device of claim 11 further comprising a spring for biasing each locking member radially outwardly against the retaining ring.

13. The coupling device of claim 12 wherein each spring is mounted in a radial bore in one of the locking members and so as to engage and bias the other locking member against the retaining ring.

14. The coupling device of claim 1 wherein the tool support comprises an annular peripheral groove, and wherein the device further comprises a stationary frame which includes a safety abutment extending into the groove for preventing axial movement of the tool support during rotation thereof by the drive motor.

15. The coupling device of claim 14 wherein the safety abutment is positioned to be received in the groove in a non-contacting relationship under normal operation, and further comprising a signalling device which is actuated upon contact between the safety abutment and the groove.

16. A device for releasably coupling a machine tool support to a drive motor which rotates the machine tool support about an axis, said device comprising
   a hollow shaft projection connected to the drive motor,
   a connection element configured to be received within the hollow shaft projection and being connected to the tool support,
   a locking device for releasably securing the connection element within the hollow shaft projection and which is actuated by centrifugal force exerted during rotation of the drive motor and tool support, and wherein the locking device comprises two locking members which are mounted to the hollow shaft projection, with the two locking members being mounted for limited movement in opposite and aligned radial directions and so that each locking member engages the connection element in a locking relationship by reason of the centrifugal force, and wherein the two locking members each include an oblique surface that is oblique with respect to the axis of rotation and that mates with a corresponding oblique surface on the connection element such that a portion of the centrifugal force is deflected to an axial force upon the tool support.

17. The coupling device of claim 16 wherein the hollow shaft projection has a bore which defines an internal cone, and the connection element defines an external cone so as to provide a formfitting interengagement therebetween.

18. The coupling device of claim 17 wherein the connection element includes an enlargement at a forward end thereof, and wherein the enlargement includes the oblique surface of the connection element, and wherein the mating oblique surfaces produce a press fit between the cones of the hollow shaft projection and the connection element.

* * * * *